T. A. Clements,
Chase.
No. 108,760.    Patented Nov. 1, 1870.
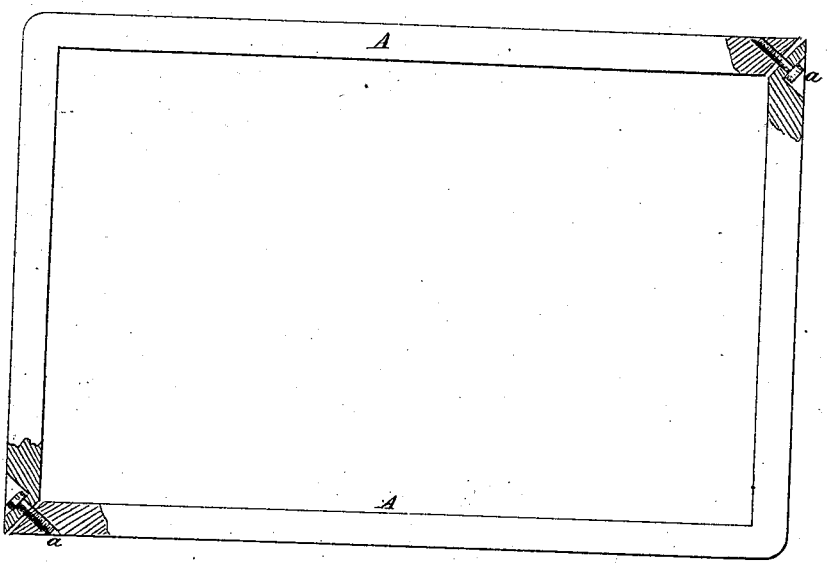
WITNESSES:
Gustave Dieterich
L. S. Raber
INVENTOR:
T. A. Clements
pr. Munn & Co.
ATTORNEYS.

UNITED STATES PATENT OFFICE.

THOMAS A. CLEMENTS, OF LITTLE ROCK, ARKANSAS.

IMPROVEMENT IN PRINTERS' CHASES.

Specification forming part of Letters Patent No. 108,760, dated November 1, 1870.

*To all whom it may concern:*

Be it known that I, THOMAS A. CLEMENTS, of Little Rock, in the county of Pulaski and State of Arkansas, have invented a new and Improved Printer's Chase; and I do hereby declare that the following is a full, clear, and exact description thereof, which will enable others skilled in the art to make and use the same, reference being had to the accompany-drawing, forming part of this specification, in which—

The drawing represents a plan view, partly in section, of my improved chase.

This invention has for its object to so improve printers' chases that the same can, by means of the ordinary metal furniture, be properly adjusted to the types, the beveled furniture, quoins, shooting-sticks, and mallets being dispensed with.

Another object of the invention is to economize labor and time in the application of the chase.

The invention consists in constructing each chase of two L-shaped sections, which are connected with each other at the adjoining corners by oblique screws, so that by means of the latter the size of the chase can be regulated and the types clamped tightly and squarely. A square and exact form and a perfect register is thus obtained without loss of time and labor.

A in the drawing is the chase, composed of two L-shaped sections that are joined at the ends and connected by screws $a$ $a$, the said screws passing obliquely through the adjoining ends, as shown. They will serve to open and close the sections in suitable manner, and to adjust the size of the forms of type lengthwise and sidewise at once, so as to close the types with equal pressure from all sides.

Having thus described my invention, I claim as new and desire to secure by Letters Patent—

The chase A, composed of two L-shaped sections which are adjustable by screws $a$ in the corners, substantially as herein shown and described.

THOMAS A. CLEMENTS.

Witnesses:
WALTER WATKINS,
THOMAS B. HENNEBERRY.